United States Patent [19]

Yu

[11] Patent Number: 5,734,211
[45] Date of Patent: Mar. 31, 1998

[54] SPINDLE MOTOR WITH SOUNDPROOFING

[75] Inventor: Seung Wan Yu, Suwon, Rep. of Korea

[73] Assignee: Samsung Electro-Mechanics Co., Ltd., Suwon, Rep. of Korea

[21] Appl. No.: 692,673

[22] Filed: Aug. 6, 1996

[30] Foreign Application Priority Data

Nov. 30, 1995 [KR] Rep. of Korea ............ 95-45372

[51] Int. Cl.$^6$ ................ H02K 5/16; H02K 5/24
[52] U.S. Cl. ................ 310/51; 310/67 R; 310/89
[58] Field of Search ................ 310/51, 89, 67 R

[56] References Cited

U.S. PATENT DOCUMENTS 2,505,854  5/1950  Curzon ............................ 310/51
5,357,160  10/1994  Kaneda et al. .................. 310/67 R
5,483,113  1/1996  Sakuragi et al. ................ 310/67 R

FOREIGN PATENT DOCUMENTS 22888505  10/1995  United Kingdom ............ 310/51

*Primary Examiner*—Thomas M. Dougherty
*Assistant Examiner*—K. Tamai
*Attorney, Agent, or Firm*—Ladas & Parry

[57] ABSTRACT

A spindle motor comprises a soundproof wall formed on a stator outside a peripheral surface of a rotor. Noise generated inside the motor during the operation is cut off by the wall to be reduced remarkably. Since the soundproof wall has no influence on the volume of the motor, a slim-type motor can be realized.

2 Claims, 1 Drawing Sheet

SPINDLE MOTOR WITH SOUNDPROOFING

BACKGROUND OF THE INVENTION

1. Field of the Invention

The present invention relates to a spindle motor. More particularly, the invention relates to a spindle motor with a soundproofing formed on a stator outside a peripheral surface of a rotor part for preventing noises and obtaining a slim-type motor.

2. Description of the Prior Art

FIG. 1 illustrates a schematic construction of a outer rotor-type DC spindle motor.

Referring to FIG. 1, the spindle motor comprises a rotor 1 and a stator 2. The rotor 2 includes a shaft 3, bearing 4, case 5 and magnet 6, while the stator 2 has a bearing holder 7 supporting the bearing 4 and the shaft 3. A core 9 with a wound coil 8 is fixed in the bearing holder 7 of the stator 2, and the bearing holder 7 is formed integrally with a mounting plate 10 fixed to a housing.

With this construction of the motor, the core 9 and the magnet 6 of the rotor 1 cooperate to rotate the rotor 1 when a current is applied to the coil 8 of the stator 2.

Noise inside the motor, however, escapes from the motor by way of a gap between the rotor 1 and the stator 2 during the rotation of the rotor 1. This noise is amplified by their reflection against the mounting plate 10 of the stator 2.

Furthermore, in the case of a motor mounted on a motor set, such noise is even further amplified by resonance, which is one critical problem in manufacturing current low-noise motor sets.

It is nearly impossible to eliminate the noise because of its irregular reflection on outer members when the rotor rotates due to friction of the motor bearings and eccentricity.

Many suggestions have been made in order to prevent the noise, for example, a method of precision manufacture of a motor and a method by providing an outer soundproofing. The precision motor manufacture, however, has its limitations, and the separate soundproofing requires a larger space for the motor installation and thus causes an increase in the cost of production and installation as well as presenting difficulties in manufacturing a slim-type apparatus or motor.

SUMMARY OF THE INVENTION

It is an object of the present invention to provide a spindle motor with soundproofing means for minimizing motor noise and realizing a slim-type motor manufacture.

The characteristic of the present invention for attainment of this object is that in a spindle motor having a rotor and a stator, the spindle motor comprises soundproofing means formed on the stator outside a peripheral surface of the rotor.

According to this characteristic, the noise generated inside the motor during operation is absorbed in or reflected on the soundproofing means so as to prevent resonance and reduce the noise intensity substantially, and the volume of the motor does not increase because the soundproofing means is formed on the stator, which means that a slim-type motor can be achieved.

BRIEF DESCRIPTION OF THE DRAWINGS

The above and other objects and advantages of the present invention will become more readily apparent upon consideration of the following description and drawings in which.

DESCRIPTION OF THE PREFERRED EMBODIMENTS

Figure 1:
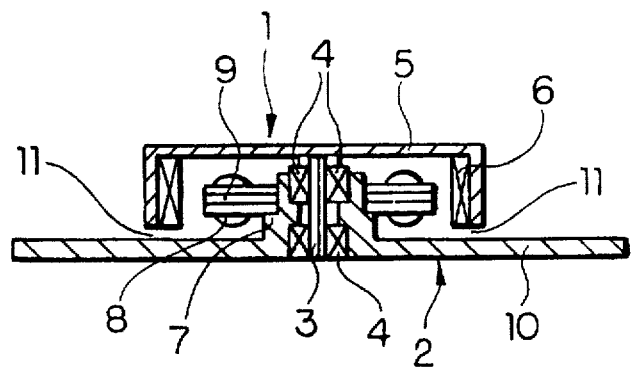
FIG. 1 is a schematic sectional view of a conventional spindle motor.
Figure 2:
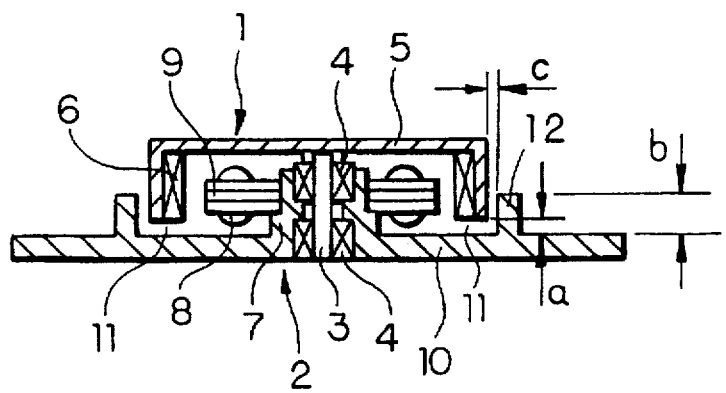
FIG. 2 is a schematic sectional view according to a first embodiment of the present invention.

FIG. 2 is a sectional view of a spindle motor illustrating an embodiment of the invention. Referring to FIG. 2, the spindle motor comprises a rotor 1 including a shaft 3, bearings 4, case 5 and magnet 6, and a stator 2 including a bearings holder 7 for supporting the bearing 4 and the shaft 3 and a core 9 fixed in the bearing holder 7 for winding a coil 8. The bearing holder 7 is formed integrally with or fixed to a mounting plate 10. The case 5 has an upper, horizontal end wall 5a and a cylindrical perimetral wall 5b extending downwards from wall 5a. The shaft 3 is fixed to end wall 5a and extends downwardly and centrally therefrom. The magnet 6 is fixed to the inner cylindrical surface of the wall 5b and faces coil 8.

According to this embodiment, a soundproof wall 12 as a soundproofing is formed on the mounting plate 10 of the stator 2. The soundproof wall 12 has parallel, inner and outer circumferential surfaces extending downwardly from an upper horizontal edge of the wall, and the wall 12 projects upwardly from a planar upper surface of the mounting plate 10 and extends concentrically to the case 5 of the rotor 1. The soundproof wall 12 is preferably formed integrally with the mounting plate 10 of the stator 2 and, as seen in FIG. 2, has a rectangular cross-section.

Furthermore, the soundproof wall 12 is so formed that its height is correspondent to or more than a distance a between the the lower edge of cylindrical perimetral wall of case 5 of rotor 1 and the stator 2 and a distance c between the inner surface of soundproof wall 12 and the perimetral wall of case 5 of the rotor 1 is correspondent to or less than the distance a between the rotor 1 and the stator 2, i.e. $a \leq b$ and $a \leq c$.

The soundproof function of the soundproof wall 12 is described below.

When the motor is operated, noise is generated inside the motor and this noise resonates outside through the gap a between the lower edge of the perimetral wall of the rotor case 5 and the mounting plate 10 of the stator 2. The noise, however, impacts against the wall 12 prior to its escape outside to return inside the motor, with the result that only very little noise is conducted outside.

Moreover, although the noise is generated and travels outward, it does not escape outside until it undergoes multiple reflection and refraction on the wall 12, thereby the noise is reduced considerably. In other words, the noise travelling outward is absorbed in or reflected on the mounting plate 10 of the stator 2 and thus the magnitude of noise is reduced substantially.

Additionally, since the wall 12 is formed integrally with the motor stator, a slim-type motor is realized due to the fact that the wall 12 has no effect on the volume of the motor.

Figure 3:
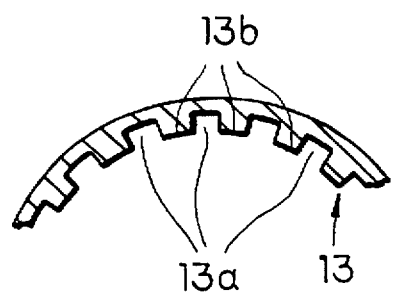
FIG. 3 is a fragmentary plan view of a soundproof wall of the spindle motor according to a second embodiment of the present invention.

In FIG. 3 there is seen a second embodiment of the invention. Referring to FIG. 3, the soundproof wall 12 is formed with a plurality of circumferentially spaced vertical grooves 13a of rectangular section forming alternating ribs 13b therebetween on its inner circumferential surface 13. These grooves 13a and ribs 13b optimize the soundproof effect by more effective reflection and refraction of the noise on the wall.

Figure 4:
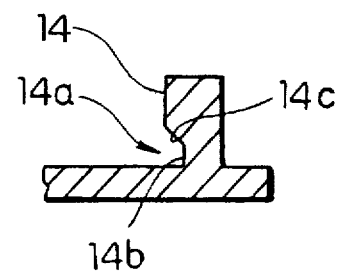
FIG. 4 is a fragmentary front view of a soundproof wall of the spindle motor according to a third embodiment of the present invention.

FIG. 4 illustrates a third embodiment of the invention. According to FIG. 4, the soundproof wall 12 is formed with a concave groove 14a forming a recess at the lower end of the inner circumferential surface. The groove 14a is formed by a first vertical portion 14b extending from the upper surface of mounting plate 10 and a second, tapered portion 14c forming a downwardly outward surface facing the rotor case 5. This groove 14a can conduct the reflection and the refraction of the noise to the mounting plate 10 of the stator 2 and prevent the noise from escaping outside along with the wall.

As described hereinbefore, the spindle motor according to the invention permits significant reduction of the motor noise and realization of the slim-type motor.

Although the present invention has been described with reference to preferred embodiments, it will be understood that various changes and modifications may be made by those of skill in the art without departing from the spirit and the scope of the invention as set forth in the following claims.

What is claimed is:

1. A spindle motor comprising a rotor, a stator and soundproofing means on said stator in surrounding relation to said rotor for reducing noise produced by the motor, said rotor comprising a case including a horizontal end wall and a cylindrical perimetral wall extending downwards from said horizontal end wall, a shaft fixedly mounted on said horizontal end wall and extending downwardly and centrally therefrom, and a magnet fixed to said cylindrical wall at an inner circumferential surface thereof, said stator comprising a flat, horizontal mounting plate including an upwardly projecting bearing holder, bearings fitted in said bearing holder and rotatably supporting said shaft of the rotor, and a coil core fixedly secured to said bearing holder in facing relation to said magnet, said soundproofing means comprising a cylindrical wall projecting upwardly from a planar, upper surface of said horizontal mounting plate of said stator, said cylindrical wall having vertical inner and outer circumferential surfaces extending downwardly from an upper, horizontal edge of said wall, said inner circumferential surface of said cylindrical wall facing an outer circumferential surface of said case of the rotor, said inner and outer circumferential surfaces of said cylindrical wall being substantially parallel to confer a transverse cross-section for said cylindrical wall of said soundproofing means which is rectangular, said inner circumferential surface of said cylindrical wall of said soundproofing means being provided with a plurality of circumferentially spaced, vertical grooves defining respective ribs between adjacent grooves, said grooves extending from said upper edge of said cylindrical wall to the planar, upper surface of the horizontal mounting plate, said grooves being rectangular in cross-section.

2. A spindle motor comprising a rotor, a stator and soundproofing means on said stator in surrounding relation to said rotor for reducing noise produced by the motor, said rotor comprising a case including a horizontal end wall and a cylindrical perimetral wall extending downwards from said horizontal end wall, a shaft fixedly mounted on said horizontal end wall and extending downwardly and centrally therefrom, and a magnet fixed to said cylindrical wall at an inner circumferential surface thereof, said stator comprising a flat, horizontal mounting plate including an upwardly projecting bearing holder, bearings fitted in said bearing holder and rotatably supporting said shaft of the rotor, and a coil core fixedly secured to said bearing holder in facing relation to said magnet, said soundproofing means comprising a cylindrical wall projecting upwardly from a planar, upper surface of said horizontal mounting plate of said stator, said cylindrical wall of said soundproofing means having vertical inner and outer circumferential surfaces extending downwardly from an upper, horizontal edge of said wall, said inner circumferential surface of said cylindrical wall facing an outer circumferential surface of said case of the rotor, said cylindrical wall of said soundproofing means projecting a given height from said upper surface of said horizontal mounting plate, said inner circumferential surface of said cylindrical wall of said soundproofing means, which extends from said planar, upper surface of said horizontal mounting plate, having a recess therein which includes a first portion extending vertically from said upper planar surface of said horizontal mounting plate and a second portion which is tapered and extends from said first portion to said inner circumferential surface of said cylindrical wall of said soundproofing means to form a downwardly outwards surface facing towards said rotor case.

* * * * *